US011361084B1

(12) United States Patent
So et al.

(10) Patent No.: US 11,361,084 B1
(45) Date of Patent: Jun. 14, 2022

(54) IDENTIFYING AND PROTECTING AGAINST A COMPUTER SECURITY THREAT WHILE PRESERVING PRIVACY OF INDIVIDUAL CLIENT DEVICES USING DIFFERENTIAL PRIVACY FOR TEXT DOCUMENTS

(71) Applicant: SYMANTEC CORPORATION, Mountain View, CA (US)

(72) Inventors: Geoffrey So, Foster City, CA (US); Melanie Beck, Mountain View, CA (US); Jasjeet Dhaliwal, Morgan Hill, CA (US); Andrew B. Gardner, Roswell, GA (US); Aleatha Parker-Wood, Palo Alto, CA (US)

(73) Assignee: NORTONLIFELOCK INC., Tempe, AZ (US)

( * ) Notice: Subject to any disclaimer, the term of this patent is extended or adjusted under 35 U.S.C. 154(b) by 405 days.

(21) Appl. No.: 16/224,416

(22) Filed: Dec. 18, 2018

(51) Int. Cl.
*H04L 29/06* (2006.01)
*G06F 21/60* (2013.01)
*G06N 20/00* (2019.01)
*H04L 9/40* (2022.01)
*G06F 21/55* (2013.01)

(52) U.S. Cl.
CPC ............ *G06F 21/60* (2013.01); *G06F 21/554* (2013.01); *G06N 20/00* (2019.01); *H04L 63/1416* (2013.01)

(58) Field of Classification Search
CPC ..... H04L 63/00; H04L 63/1416; G06F 16/00; G06F 21/60; G06F 21/554; H04W 4/00; G06N 20/00
See application file for complete search history.

(56) References Cited

U.S. PATENT DOCUMENTS

| 5,949,885 A * | 9/1999 | Leighton ............ H04N 1/32304 380/54 |
| 6,671,387 B1 * | 12/2003 | Chen ..................... G06T 1/0028 382/100 |
| 2010/0250497 A1 * | 9/2010 | Redlich ............... H04L 63/0227 707/661 |

OTHER PUBLICATIONS

Friedman, A., & Schuster, A. (Jul. 2010). Data mining with differential privacy. In Proceedings of the 16th ACM SIGKDD international conference on Knowledge discovery and data mining (pp. 493-502). ACM.

(Continued)

*Primary Examiner* — Joseph P Hirl
*Assistant Examiner* — Leynna Truvan
(74) *Attorney, Agent, or Firm* — Maschoff Brennan (57) ABSTRACT

Identifying and protecting against a computer security threat while preserving privacy of individual client devices using differential privacy for text documents. In some embodiments, a method may include receiving, at the remote server device, text documents from one or more local client devices, generating, at the remote server device, a differential privacy document vector for each of the text documents, identifying, at the remote server device, a computer security threat to a first one of the one or more local client devices using the differential privacy document vectors, and, in response to identifying the computer security threat, protecting against the computer security threat by directing performance, at the first local client device or the remote server device, of a remedial action to protect the first local client device from the computer security threat.

21 Claims, 4 Drawing Sheets

(56) References Cited

OTHER PUBLICATIONS

Blum, A., Dwork, C., McSherry, F., & Nissim, K. (Jun.2005). Practical privacy: the SuLQ framework. In Proceedings of the twenty-fourth ACM SIGMOD-SIGACT-SIGART symposium on Principles of database systems (pp. 128-138). ACM.
Dwork, C. (2006). Differential privacy. In International Colloquium on Automata, Languages and Programming (pp. 1-12). Springer, Berlin, Heidelberg.
Dwork, C., McSherry, F., Nissim, K., & Smith, A. (Mar. 2006). Calibrating noise to sensitivity in private data analysis. In Theory of cryptography conference (pp. 265-284). Springer, Berlin, Heidelberg.
McSherry, F., & Talwar, K. (Oct. 2007). Mechanism design via differential privacy. In Foundations of Computer Science, 2007. FOCS'07. $48^{th}$ Annual IEEE Symposium (pp. 94-103). IEEE.
Weggenmann B., & Kerschbaum F. (2018). SynTF: Synthetic and Differentially Private Term Frequency Vectors for Privacy-Preserving Text Mining. In arXiv preprint arXiv:1805.00904.
Dwork, C. (Apr. 2008). Differential privacy: A survey of results. In International Conference on Theory and Applications of Models of Computation (pp. 1-19). Springer, Berlin, Heidelberg.
Dwork, C., & Roth, A. (2014). The algorithmic foundations of differential privacy. In Foundations and Trends in Theoretical Computer Science, 9(3-4), 211-407.
Kenthapadi, K., Korolova, A., Mironov, I., & Mishra, N. (2012). Privacy via the Johnson-Lindenstrauss transform. In arXiv preprint arXiv:1204.2606.
Blocki, J., Blum, A., Datta, A., & Sheffet, O. (Oct. 2012). The Johnson-Lindenstrauss transform itself preserves differential privacy. In Foundations of Computer Science (FOCS), 2012 IEEE 53rd Annual Symposium on (pp. 410-419). IEEE.
Xu, J., Zhang, Z., Xiao, X., Yang, Y., Yu, G., & Winslett, M. (2013). Differentially private histogram publication. In The VLDB Journal—The International Journal on Very Large Data Bases, 22(6), 797-822.
Agrawal, R., & Srikant, R. (2000). Privacy-preserving data mining (vol. 29, No. 2, pp. 439-450). ACM.
Jagannathan, G., Pillaipakkamnatt, K., & Wright, R. N. (Dec. 2009). A practical differentially private random decision tree classifier. In Data Mining Workshops, 2009. ICDMW'09. IEEE International Conference on (pp. 114-121). IEEE.
Mohammed, N., Chen, R., Fung, B., & Yu, P. S. (Aug. 2011). Differentially private data release for data mining. In Proceedings of the 17th ACM SIGKDD international conference on Knowledge discovery and data mining (pp. 493-501). ACM.
Vaidya, J., & Clifton, C. (Aug. 2005). Privacy-preserving decision trees over vertically partitioned data. In IFIP Annual Conference on Data and Applications Security and Privacy (pp. 139-152). Springer, Berlin, Heidelberg.
Joachims, T. (1998, April). Text categorization with support vector machines: Learning with many relevant features. In European conference on machine learning (pp. 137-142). Springer, Berlin, Heidelberg.
Ikonomakis, M., Kotsiantis, S., & Tampakas, V. (2005). Text classification using machine learning techniques. In WSEAS transactions on computers, 4(8), 966-974.
Sebastiani, F. (2002). Machine learning in automated text categorization. In ACM computing surveys (CSUR), 34(1), 1-47.
Sutskever, I., Vinyals, O., & Le, Q. V. (2014). Sequence to sequence learning with neural networks. In Advances in neural information processing systems (pp. 3104-3112).
Pang, B., & Lee, L. (2008). Opinion mining and sentiment analysis. In Foundations and Trends in Information Retrieval, 2(1-2), 1-135.
Narayanan, A., &Shmatikov, V. (May 2008). Robust de-anonymization of large sparse datasets. In Security and Privacy, 2008. SP 2008. IEEE Symposium on (pp. 111-125). IEEE.
Dinur, I., & Nissim, K. (Jun. 2003). Revealing information while preserving privacy. In Proceedings of the twenty-second ACM SIGMOD-SIGACTSIGART symposium on Principles of database systems (pp. 202-210). ACM.
Dwork, C., McSherry, F., & Talwar, K. (Jun. 2007). The price of privacy and the limits of LP decoding. In Proceedings of the thirty-ninth annual ACM symposium on Theory of computing (pp. 85-94). ACM.
Mikolov, T., Sutskever, I., Chen, K., Corrado, G. S., & Dean, J. (2013). Distributed Yepresentations of words and phrases and their compositionality. In Advances in neural information processing systems (pp. 3111-3119).
Awad, W. A., & ELseuofi, S. M. (2011). Machine Learning methods for E-mail Classification. In International Journal of Computer Applications, 16(1). Chicago.
Chen, T., & Guestrin, C. (Aug. 2016). Xgboost: A scalable tree boosting system. In Proceedings of the 22nd acm sigkdd international conference on knowledge discovery and data mining (pp. 785-794). ACM.
Pedregosa, F., Varoquaux, G., Gramfort, A., Michel, V., Thirion, B., Grisel, O., & Vanderplas, J. (2011). Scikit-learn: Machine learning in Python. In Journal of machine learning research, 12(Oct.), 2825-2830.
V. Metsis, I. Androutsopoulos & G. Paliouras, "Spam Filtering with Naive Bayes—Which Naive Bayes?". In Proceedings of the 3rd Conference on Email and Anti-Spam (CEAS 2006), Mountain View, CA, USA, 2006.
Nigam, K., McCallum, A. K., Thrun, S., & Mitchell, T. (2000). Text classification from labeled and unlabeled documents using EM. Machine learning, 39(2-3), 103-134.
Chaudhuri, K., Monteleoni, C., & Sarwate, A. D. (2011). Differentially private empirical risk minimization. Journal of Machine Learning Research, 12(Mar.), 1069-1109. Chicago.
Balog et al.; "Differentially Private Database Release via Kernel Mean Embeddings"; presented at the Proceedings of the $35^{th}$ International Conference on Machine Learning; Stockholm, Sweden; 2018; 17 pages.
U.S. Appl. No. 16/224,394; titled "Identifying and Protecting Against a Computer Security Threat While Preserving Privacy of Individual Client Devices Using Differential Privacy Machine Learning for Streaming Data"; filed Dec. 18, 2018; 41 pages.

\* cited by examiner

IDENTIFYING AND PROTECTING AGAINST A COMPUTER SECURITY THREAT WHILE PRESERVING PRIVACY OF INDIVIDUAL CLIENT DEVICES USING DIFFERENTIAL PRIVACY FOR TEXT DOCUMENTS

BACKGROUND

Modern computers and computer networks are subject to a variety of security threats. For example, malware is software intentionally designed to cause damage to a computer or computer network. Malware typically does damage after it infects a targeted computer. In another example, a malicious application or rogue employee may attack a targeted computer in order to steal or otherwise misuse sensitive data stored on, or accessible to, the computer. Unfortunately, it can be difficult to detect security threats in order to limit or prevent harm to the targeted computer.

One method for detecting a security threat against a computer or computer network involves a security company collecting and analyzing data related to security threats from their customers' computers. Although a security company may benefit from collecting this data from their customers' computers, some customers may object to this collection of data as an invasion of privacy because the data may reveal sensitive information about the customers that the customers would rather keep private.

The subject matter claimed herein is not limited to embodiments that solve any disadvantages or that operate only in environments such as those described above. Rather, this background is only provided to illustrate one example technology area where some embodiments described herein may be practiced.

SUMMARY

In some embodiments, a computer-implemented method for identifying and protecting against a computer security threat while preserving privacy of individual client devices using differential privacy for text documents may be at least partially performed by a remote server device including one or more processors. The method may include receiving, at the remote server device, text documents from one or more local client devices, generating, at the remote server device, a differential privacy document vector for each of the text documents, identifying, at the remote server device, a computer security threat to a first one of the one or more local client devices using the differential privacy document vectors, and, in response to identifying the computer security threat, protecting against the computer security threat by directing performance, at the first local client device or the remote server device, of a remedial action to protect the first local client device from the computer security threat. In these embodiments, the generating may include projecting, at the remote server device, each word from the text document into a word vector using text embedding, combining, at the remote server device, each of the word vectors into a document vector, and adding, at the remote server device, noise to the document vector using a differential privacy mechanism to generate the differential privacy document vector to preserve privacy of the text document by preventing any particular word from being inferred from the differential privacy document vector as being present in the text document.

In some embodiments, the performing, at the one or more local client devices, of the remedial action may include one or more of blocking the one or more local client devices from accessing a network, rolling back one or more changes at the one or more local client devices that were made in response to the computer security threat, or temporarily freezing activity at the one or more local client devices, or some combination thereof.

In some embodiments, the identifying of the computer security threat to one or more of the local client devices using the differential privacy document vectors may include storing, at the remote server device, the differential privacy document vectors in a database, training, at the remote server device, a machine learning classifier using the differential privacy document vectors stored in the database, and identifying, at the remote server device, the computer security threat to one or more of the local client devices using the trained machine learning classifier. In these embodiments, the identifying of the computer security threat to one or more of the local client devices using the trained machine learning classifier may include receiving, at the remote server device, a second text document from a second local client device, generating, at the remote server device, a second document vector for the second text document, and identifying, at the remote server device, the computer security threat to the second local client device using the second document vector as input to the trained machine learning classifier. Further, in these embodiments, the training, at the remote server device, of the machine learning classifier using the differential privacy document vectors stored in the database may prevent the text documents from being exposed due to an explorative attack against the machine learning classifier. Further, in these embodiments, the method may further include sharing, at the remote server device, the differential privacy document vectors stored in the database with other devices without revealing the text documents.

In some embodiments, the differential privacy mechanism may not be a local differential privacy mechanism.

In some embodiments, one or more non-transitory computer-readable media may include one or more computer-readable instructions that, when executed by one or more processors of a remote server device, cause the remote server device to perform a method for identifying and protecting against a computer security threat while preserving privacy of individual client devices using differential privacy for text documents.

In some embodiments, a remote server device may include one or more processors and one or more non-transitory computer-readable media that include one or more computer-readable instructions that, when executed by the one or more processors, cause the remote server device to perform a method for identifying and protecting against a computer security threat while preserving privacy of individual client devices using differential privacy for text documents.

It is to be understood that both the foregoing summary and the following detailed description are explanatory and are not restrictive of the invention as claimed.

BRIEF DESCRIPTION OF THE DRAWINGS

Embodiments will be described and explained with additional specificity and detail through the use of the accompanying drawings in which.

DETAILED DESCRIPTION

Security threats to computers and computer networks can be difficult to detect. For example, when a malware infects a targeted computer, or when a malicious application or rogue employee attacks a targeted computer in order to steal or otherwise misuse sensitive data stored on, or accessible to, the computer, it can be difficult to detect the malware infection or the attack in order to limit or prevent harm to the targeted computer.

One method employed to detect a security threat against a computer or computer network involves a security company collecting data related to security threats from their customers' computers. However, some customers may object to this collection of data as an invasion of privacy because of the sensitive information that the data may reveal about the customers. For example, a customer may object to sharing data related to malware infections experienced by its computers, or data related to sensitive data stolen or otherwise misused on its computers, for fear that this information may be embarrassing if obtained by competitors or customers, or for fear that purveyors of the malware or malicious parties behind the attacks may obtain this information and use it to execute future attacks on the customer's computers. Therefore, although a security company may benefit from the collection of data from its customers' computers, the customers may feel that this collection of potentially sensitive data intrudes upon their privacy, and as such, they may not be comfortable with opting-in to this data collection unless their privacy can be protected.

One method a security company may employ to collect customer data, while offering some level of privacy guarantee to the customer, involves using local differential privacy (LDP). Using LDP, each customer locally perturbs or randomizes their actual data, and shares the perturbed version of their actual data with the security company. After observing a customer's perturbed data, the security company may not be able to infer or reverse-engineer the customer's actual data with strong confidence. Nevertheless, over large populations, the impact of perturbation and randomization may be expected to cancel out after the customers' perturbed or randomized data is aggregated, and therefore an analysis of the aggregated perturbed or randomized data may be able to accurately estimate aggregate statistics and trends pertaining to the whole population.

In some situations, customers may be willing to securely stream their actual data to a security company as long as their actual data is never stored or otherwise used in a way that could lead to their actual data being compromised by a malicious third party. For example, customers may want to avoid their actual data being used in a way that it may be exposed even if never directly stored, such as where their actual data is used to train a machine learning classifier and then an explorative attack against the machine learning classifier (e.g., against the server device on which the machine learning classifier is executing) uncovers or extracts the actual data that was used to train the machine learning classifier. In these situations, a security company may receive actual data values at a remote server that is streamed from customer computers, and then generate and store perturbed data values at the remote server using a differential privacy (DP) mechanism, while discarding the actual data values. The perturbed data values may then be used to train a machine learning classifier that may be used to identify a security threat to one or more customer computers.

For example, security companies may collect text documents (e.g., emails, business documents, contracts, spreadsheets with text fields, health care records, etc.) related to security threats from their customers' computers. Analyzing text documents may be particularly helpful in identifying certain security threats such as spear phishing security threats, lateral document movement security threats, business email compromise (BEC) security threats, and user modeling security threats. Unfortunately, however, training a machine learning classifier using text documents that were represented using current privacy mechanisms, such as minhash, may result in a poorly trained machine learning classifier. For example, using minhash on text documents may result in the treating of semantically irrelevant content the same as relevant content, and may result in under-sampling of longer text documents and in over-sampling of shorter text documents. Further, using minhash on text documents may result in privacy concerns for shorter text documents.

Thus, a machine learning classifier that is trained with text documents that were represented using conventional privacy mechanisms may suffer in the accuracy of its inferred decisions, thus resulting, for example, in less accurate detection of a security threat to a targeted computer, resulting in increased harm to the targeted computer.

Some embodiments disclosed herein may provide various benefits. In particular, some embodiments disclosed herein may, for example, enable identifying and protecting against a computer security threat while preserving privacy of individual client devices using differential privacy for text documents.

In some embodiments, a remote server device may receive text documents securely streamed (over an encrypted channel such as an HTTPS connection, for example) from multiple local client devices, and then generate a differential privacy document vector for each of the text documents using a combination of text embeddings and differential privacy. The remote server may then store the differential privacy document vectors in a database at the remote server, without ever storing the text documents (e.g., by discarding the text documents), thus preserving the privacy of the text documents. The remote data server may then use the differential privacy document vectors stored in the database to train a machine learning classifier at the remote server. Later, the remote server device may receive another text document securely streamed from a local client device. Without storing the text document, the remote server may use the text document (or a document vector generated from the text document) as an input to the trained machine learning classifier to make an inferred decision, such as to identify a security threat to the local client device. Since differential privacy document vectors were used to train the machine learning classifier, the accuracy of the inferred decision made by the trained machine learning classifier may be higher than if the training data consisted of text documents that were represented using conventional privacy mechanisms. Thus, where the inferred decision is an identification of a computer security threat to the local client device, this identification may be more accurate, which may allow for a remedial action to be performed to protect the local client device from the computer security threat, thus limiting or preventing harm to the local client device.

Although some embodiments of the methods disclosed herein are disclosed as being employed in connection with identifying and protecting against a computer security threat, it is understood that a computer security threat is only one of countless practical applications for the methods disclosed herein. For example, the methods disclosed herein may be employed in other practical applications where it is desirable to collect and aggregate text documents in a privacy-preserving manner, for example in order to entice customers to be willing to opt-in to data collection. These applications may include, but are not limited to, a security company gathering sensitive text documents from its customers such as text documents containing device statistics, server logs, product telemetry, and other various security-related or non-security-related information. Therefore, the methods disclosed herein are not limited to being employed in connection with identifying and protecting against a computer security threat, but may also or instead be employed in any other practical application.

Figure 1:
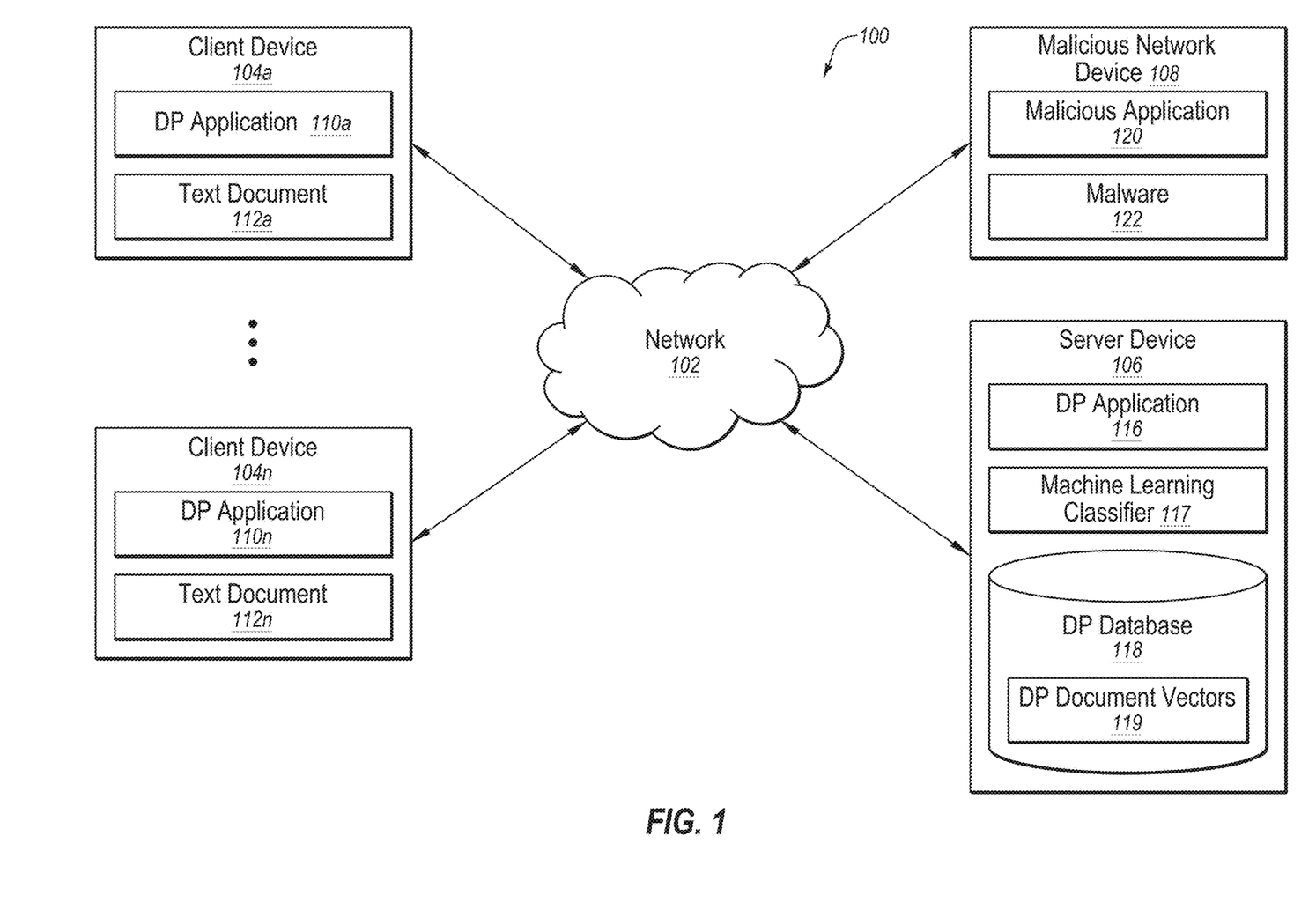
FIG. 1 illustrates an example system configured for identifying and protecting against a computer security threat while preserving privacy of individual client devices using differential privacy for text documents.

Turning to the figures, FIG. 1 illustrates an example system 100 configured for identifying and protecting against a computer security threat while preserving privacy of individual client devices using differential privacy for text documents. The system 100 may include a network 102, client devices 104a-104n, a server device 106, and a malicious network device 108.

In some embodiments, the network 102 may be configured to communicatively couple the client devices 104a-104n, the server device 106, and the malicious network device 108 to one another, as well as to other network devices and other networks. In some embodiments, the network 102 may be any wired or wireless network, or combination of multiple networks, configured to send and receive communications between systems and devices. In some embodiments, the network 102 may include a Personal Area Network (PAN), a Local Area Network (LAN), a Metropolitan Area Network (MAN), a Wide Area Network (WAN), a Storage Area Network (SAN), or some combination thereof. In some embodiments, the network 102 may also be coupled to, or may include, portions of a telecommunications network, including telephone lines, for sending data in a variety of different communication protocols, such as a cellular network or a Voice over IP (VoIP) network.

Figure 4:
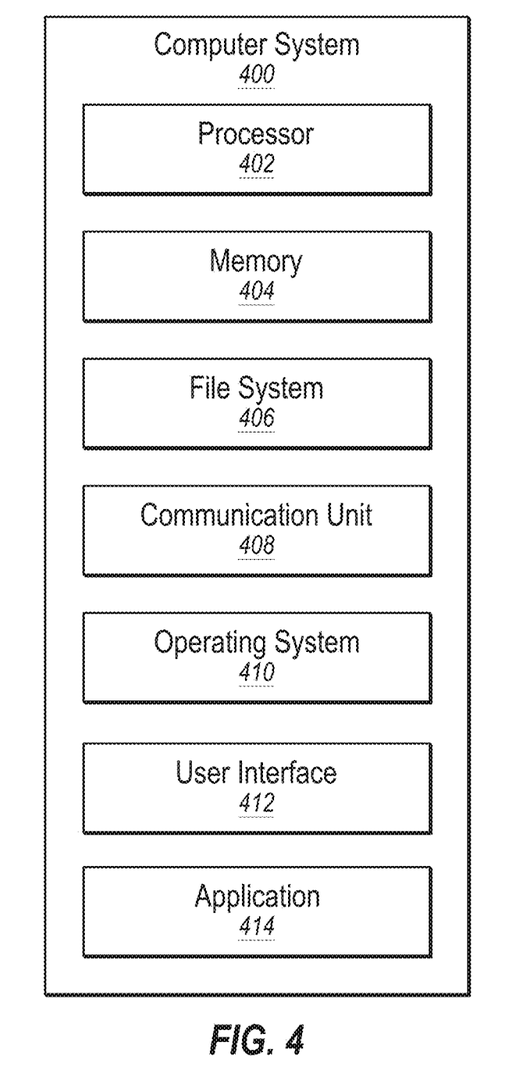
FIG. 4 illustrates an example computer system that may be employed in identifying and protecting against a computer security threat while preserving privacy of individual client devices using differential privacy for text documents.

In some embodiments, the malicious network device 108 may be any computer system capable of communicating over the network 102 and capable of executing a malicious application 120 that attempts to infect other network devices with malware 122, or otherwise attack other network devices, examples of which are disclosed herein in connection with the computer system 400 of FIG. 4. In some embodiments, the malware 122 may be, or may include the functionality of, one or more of a spyware, a virus, a worm, a logic bomb, a trapdoor, a Trojan horse, a Remote Admin Trojan (RAT), a mobile malicious code, a malicious font, and a rootkit.

In some embodiments, each of the client devices 104a-104n may be any computer system capable of communicating over the network 102 and capable of executing a differential privacy (DP) application, examples of which are disclosed herein in connection with the computer system 400 of FIG. 4. The client devices 104a-104n may include DP applications 110a-110n, respectively. The DP applications 110a-110n may be configured to implement one or more actions of the methods disclosed herein. For example, the DP applications 110a-110n may be configured to access text documents 112a-112n, and then send the text documents 112a-112n to the server device 106, over a secure channel for example. In some embodiments, the text documents 112a-112n may relate to one or more security threats against the client devices 104a-104n. An example of a computer security threat may include infection by the malware 122. Other examples of computer security threats may include an attack by the malicious application 120, or an attack by a rogue employee, that is intended to steal or otherwise misuse sensitive data stored on, or accessible to, one or more of the client devices 104a-104n, such as spear phishing security threats, lateral document movement security threats, business email compromise (BEC) security threats, and user modeling security threats.

In some embodiments, the server device 106 may be any computer system capable of communicating over the network 102 and capable of executing a DP application 116, examples of which are disclosed herein in connection with the computer system 400 of FIG. 4. The DP application 116 may be configured to implement one or more actions of the methods disclosed herein. For example, the DP application 116 may be configured to receive the text documents 112a-112n streamed from the client devices 104a-104n, and generate DP document vectors 119 for each of the text documents using a combination of text embeddings and differential privacy, as discussed in greater detail in connection with FIG. 2. The DP application 116 may also be configured to store the DP document vectors 119 in a DP database 118, and then train a machine learning classifier 117 using the DP document vectors 119 stored in the DP database 118. All this is done without storing the text documents 112a-112n themselves, thus preserving the privacy of the text documents 112a-112n if the DP database 118 is attacked, and thus preventing the text documents 112a-112n from being uncovered or extracted due to an explorative attack against the machine learning classifier 117. It is understood that many DP document vectors 119, such as thousands or millions or billions of DP document vectors 119, may be employed in the training of the machine learning classifier 117.

The DP application 116 may also be configured to employ the trained machine learning classifier 117 to make an inferred decision, such as to identify a security threat to the client device 104n. Since DP document vectors 119 were used to train the machine learning classifier 117, the accuracy of the inferred decision made by the trained machine learning classifier 117 may be higher than if the training data consisted of text documents that were represented using conventional privacy mechanisms. Thus, where the inferred decision is an identification of a computer security threat to the client device 104n, this identification may be more accurate, which may allow for performance of a remedial action to protect the client device 104n from the computer security threat, thus limiting or preventing harm to the local client device 104n. This remedial action may include, for example, blocking the client device 104n from accessing the network 102 (e.g., to prevent the malicious application 120 from accessing the client device 104n over the network 102), rolling back one or more changes at the client device 104n that were made in response to the computer security threat (e.g., rolling back one or more changes made by the malware 122), or temporarily freezing activity at the client device 104n (e.g., to prevent the malicious application 120 or a rogue employee from stealing or otherwise misusing data at the client device 104*n*), or some combination thereof.

Therefore, the DP applications 110*a*-110*n* and 116 may cooperate to identify and protect against a computer security threat while preserving privacy of the individual client devices 104*a*-104*n* using differential privacy for text documents. Unlike a machine learning classifier that is trained using text documents that were represented using conventional privacy mechanisms, the DP applications 110*a*-110*n* and 116 may employ the methods disclosed herein to use the DP document vectors 119, which were generated using a combination of text embeddings and differential privacy, to train the machine learning classifier 117. This may enable the machine learning classifier 117 to make a more accurate inferred decision, such as a more accurate inferred decision that identifies a security threat to the client device 104*n*, which may allow for performance of a remedial action to protect the client device 104*n* from the computer security threat, thus limiting or preventing harm to the client device 104*n*.

Modifications, additions, or omissions may be made to the system 100 without departing from the scope of the present disclosure. In some embodiments, the system 100 may include additional components similar to the components illustrated in FIG. 1 that each may be configured similarly to the components illustrated in FIG. 1.

Figure 2:
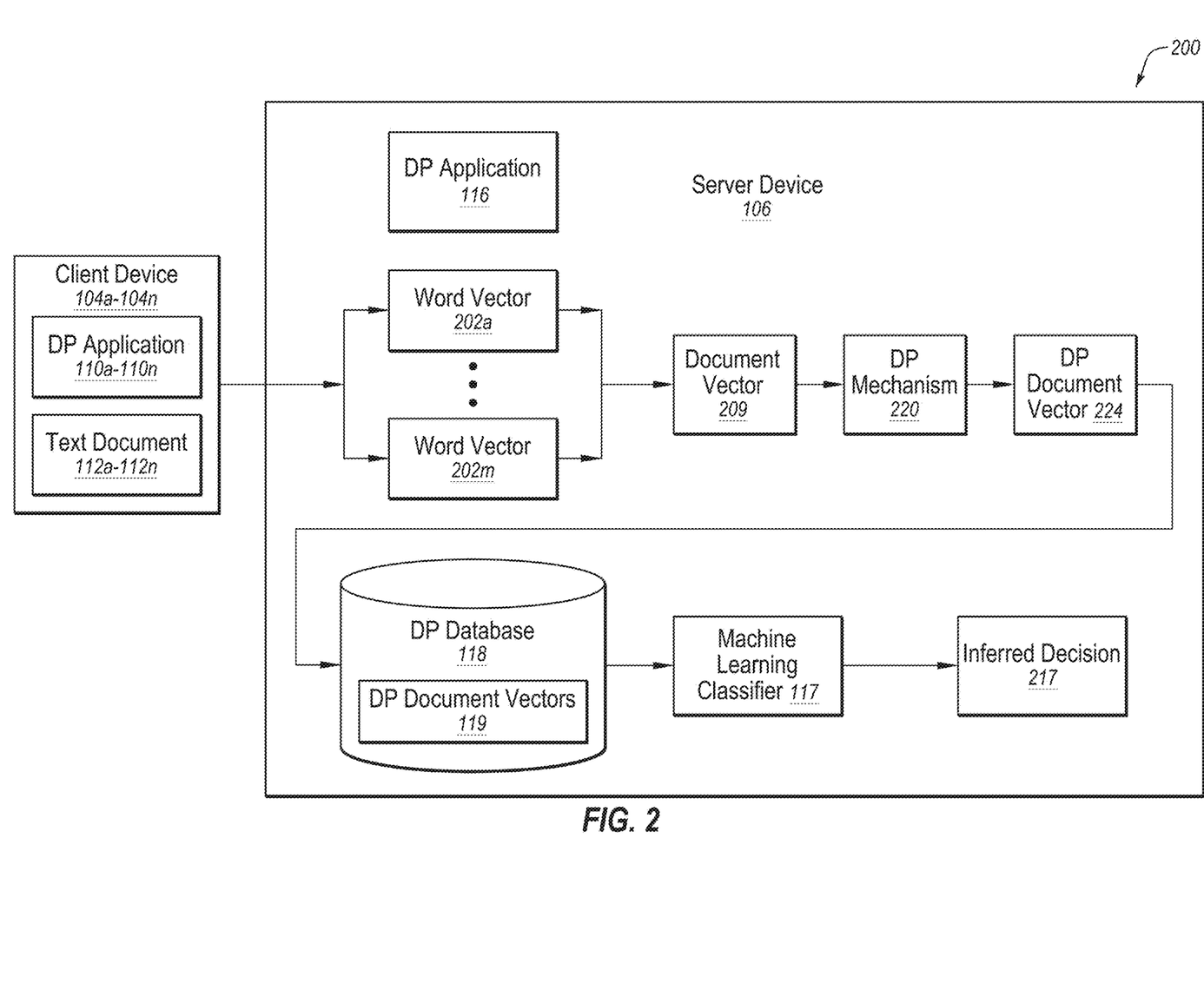
FIG. 2 is a flowchart illustrating aspects of differential privacy for text documents.

FIG. 2 is a flowchart 200 illustrating aspects of differential privacy for text documents. In particular, the flowchart 200 discloses that the DP application 116 at the server device 106 may receive text documents, such as the text documents 112*a*-112*n*, streamed from multiple client devices, such as the client devices 104*a*-104*n*. After each text document is received, the DP application 116 may use a combination of text embeddings and differential privacy to generate a DP document vector 224 for the text document.

For example, during the generation of the DP document vector 224 for the text document 112*a*, the DP application 116 may first project each word from the text document 112*a* into a word vector using text embedding, resulting in word vectors 202*a*-202*m*. For example, where the text document 112*a* is a simple email document that includes only the following ten words of text: "This email contains precisely ten words worth of information content," the DP application 116 may project each of the ten words in the text document 112*a* into the following ten word vectors:
This: [−0.2890625 0.19921875 0.16015625] . . . [0.12792969 0.12109375 −0.22949219]
email: [−0.03930664 −0.07861328 −0.11816406] . . . [−0.18457031 −0.14550781 −0.01696777]
contains: [−0.03833008 −0.23925781 0.38867188] . . . [−0.01721191 −0.03808594 0.05419922]
precisely: [0.20410156 −0.11181641 0.17773438] . . . [0.02783203 0.08642578 −0.03039551]
ten: [0.00588989 −0.09814453 0.02832031] . . . [0.07763672 −0.24121094 −0.0072937]
words: [0.23339844 0.07470703 0.19238281] . . . [−0.0612793 −0.17675781 −0.05493164]
worth: [0.16992188 0.01428223 −0.04541016] . . . [0.04150391 −0.10009766 −0.18847656]
of: [00 0] . . . [0 00]
information: [−0.07177734 −0.265625 0.1484375] . . . [−0.25976562 0.16894531 −0.16308594]
content: [0.01330566 −0.00099945 0.08007812] . . . [−0.17773438 −0.08789062 −0.0291748]
In this example, the word "of" is represented with a [0] vector because this word is not considered to carry meaningful information.

Then, during the generation of the DP document vector 224 for the text document 112*a*, the DP application 116 may next combine each of the word vectors 202*a*-202*m* into a document vector 209. Continuing with the example from above, the document vector 209 may be a sum of the word vectors 202*a*-202*m*, resulting in the following document vector:
[0.188140869140625, −0.5062484741210938, 1.01220703125] . . . [−0.4256591796875, −0.4130859375, −0.665618896484375]

Finally, during the generation of the DP document vector 224 for the text document 112*a*, the DP application 116 may next add noise to the document vector 209 using a DP mechanism 220 to generate the DP document vector 224. Continuing with the example from above, adding noise to the document vector 209 using the DP mechanism 220 may result in the following DP document vector:
[−0.16521133939856247, −0.44727972434016267, 0.7338385447021397] . . . [−0.07064802015932875, 0.35104728044993183, −0.6374521086812772]

Generation of this DP document vector 224 may preserve privacy of the text document 112*a* by preventing any particular word of the text document 112*a* from being inferred from the DP document vector 224 as being present in the text document 112*a*. Continuing with the example from above, the DP document vector 224 may prevent any particular one of the words "This email contains precisely ten words worth of information content" from being inferred as being part of the text document 112*a*. This may be particularly useful in a situation where a text document includes sensitive words such as "layoffs," "merger," "bankruptcy," "divorce," etc.

The DP application 116 may then store the DP document vector 224, along with all other DP document vectors 119, in the DP database 118. Eventually after a sufficient number of DP document vectors 119 are stored in the DP database 118, the DP application 116 may train the machine learning classifier 117 using the DP document vectors 119 as training data. All this is done without ever storing the text documents 112*a*-112*n* at the server device 106, thus preserving the privacy of the text documents 112*a*-112*n* if the DP database 118 is attacked, and also thus preventing the text documents 112*a*-112*n* from being uncovered or extracted due to an explorative attack against the machine learning classifier 117. It is understood that many DP document vectors 119, such as thousands or millions or billions of DP document vectors 119, may be employed in the training of the machine learning classifier 117.

The flowchart 200 also discloses that the DP application 116 at the server device 106 may also be configured to employ the trained machine learning classifier 117 to make an inferred decision 217, such as to identify a security threat to one or more of the client devices 104*a*-104*n*. In some embodiments, this identification may include the DP application 116 receiving a text document 112*n* from the client device 104*n*, generating a document vector 209 for the text document 112*n*, and then identifying the computer security threat to the client device 104*n* using document vector 209 as input to the trained machine learning classifier 117.

Therefore, the DP application 116 may identify and protect against a computer security threat while preserving privacy of the individual client devices 104*a*-104*n* using differential privacy for text documents. Unlike a machine learning classifier that is trained using text documents that were represented using conventional privacy mechanisms, the DP application 116 may employ the methods disclosed herein to use the DP vectors 119, which were generated using a combination of text embeddings and differential privacy, to train the machine learning classifier 117. This may enable the machine learning classifier 117 to make a more accurate inferred decision 217, such as a more accurate inferred decision 217 that identifies a security threat to the client device 104n, which may allow for performance of a remedial action to protect the client device 104n from the computer security threat, thus limiting or preventing harm to the client device 104n.

In some embodiments, the motivating insight behind the DP mechanism 220 used in the system of the flowchart 200 may be that if an adversary cannot ascertain whether or not a particular client device has text documents stored in the DP database 118, no additional information about that client device is leaked by its participation. Further, the DP mechanism 220 may capture precisely how likely the adversary is to ascertain whether a client device participated in the DP database 118.

In some embodiments, a formalized definition of the DP mechanism 220 may include the notion of neighboring databases, as follows:

Definition 1 (Neighboring databases): Given an input space $\mathcal{X}$, we can represent the database with n entries, $X \in \mathcal{X}^n$ as $X \in \mathbb{N}^{|\mathcal{X}|}$, such that $\|X\|_1 = n$ and there are a total of $|\mathcal{X}|$ "types" of entries in the input space. Two databases $X_1, X_2 \in \mathbb{N}^{|\mathcal{X}|}$ are neighbors if $\|X_1 - X_2\|_1 = 1$. That is, the two databases differ by exactly one entry.

Definition 2 (Probability Simplex): Given a set Y, the probability simplex over Y is defined as:

$$\Delta Y = \left\{ y \in \mathbb{R}^{|Y|} : \mathcal{Y}_i \geq 0, \sum_{i=1}^{|Y|} = 1 \right\}.$$

Definition 3 (Randomization Mechanism): Given two sets $\mathcal{X}$, Y, a randomization mechanism is a $\mathcal{M} : \mathcal{X} \to \Delta Y$. Thus, a randomization mechanism defines a probability distribution over the set Y. Given an input $x \in \mathcal{X}$, a randomization mechanism $\mathcal{M}$, maps x to $\mathcal{Y} \in Y$ with probability ($\mathcal{M}(x)\mathcal{Y}$, which is the probability for element y under the distribution (M(x)).

Definition 4 (Differential Privacy): For an $\varepsilon \in (0,1)$, and $\delta \in [0,1)$, a randomization mechanism $\mathcal{M}$ is $(\varepsilon, \delta)$ differentially private on domain $\mathcal{X}$ if for two neighboring databases $X_1, X_2$: $P[\mathcal{M}(X_1) \subseteq D] \leq e^{\varepsilon} P[\mathcal{M}(X_2) \subseteq D] + \delta$.

The above definition says that if a randomization mechanism maps two neighboring databases to the same set with probabilities that are within $e^{\varepsilon}$ factor and an additive $\delta$ factor of each other, then the randomization mechanism provides $(\varepsilon, \delta)$ privacy.

Differential privacy may be further divided into two sub-categories: interactive and non-interactive. In the interactive setting, a third party can only access the data by sending queries to a database access mechanism where the database access mechanism acts as a randomization mechanism. Upon receiving such a query, the database access mechanism evaluates the query on the dataset, adds randomness to the answer and sends this answer back to the third party. By randomizing the query response, the database access mechanism ensures that the answer is differentially private. However, in this setting, the system still has the underlying data, and a breach of database security will still lead to privacy loss. Some embodiments herein, therefore, focus on the non-interactive setting, in which there is no such database access mechanism. Instead, the randomization mechanism makes publicly available a randomized version of a given database that is differentially private.

The flowchart 200 of FIG. 2 may include an adaption of the above general definitions of differential privacy to the use case of providing non-interactive word-level differential privacy for text documents, such as emails. We consider two text documents (e.g., emails) to be neighbors if they differ in exactly one word.

Definition 4 (Word-Level Differential Privacy): A randomization mechanism guarantees $(\varepsilon, \delta)$ word-level differential privacy if it guarantees $(\varepsilon, \delta)$ differential privacy for two databases $X = \{e_1, \ldots, e_i, \ldots, e_N\}$ and $X^* = \{e_1, \ldots, e_i^*, \ldots, e_N\}$, that differ by only one element $e_i$ and $e_i^*$, such that $e_i$ and $e_i^*$ are neighbors. Hence, the above definition captures differential privacy if two databases of emails differ in only one word of one email.

The flowchart 200 of FIG. 2 may include text classification, which is the task of assigning a pre-defined category to a text document. More specifically, let $\{1, \ldots K\}$ be a set of predefined categories and let $\{x_1, \ldots, x_N\}$ be a set of text documents, where each document is represented as a d-dimensional vector, that is each $x_i \in \mathbb{R}^d$ for $1 \leq i \leq N$. Then, the objective of text classification is to learn a classifier f: $\mathbb{R}^d \to \{1, \ldots, K\}$, that classifies an incoming text document into one of these pre-defined categories. One focus may be the problem of spam filtering in which the text document is an email and the pre-defined categories are {spam, not-spam}. Although spam filtering is used in the examples below, it is understood that other focusses may be other problems, such as spear phishing security threats, lateral document movement security threats, business email compromise (BEC) security threats, and user modeling security threats.

The flowchart 200 of FIG. 2 may include a system design which exploits the insight that non-interactive differential privacy guarantees must be provided on stored data and that inference on streaming data can be completed before storing the data. For example, the system design of FIG. 2 may train a given machine learning classifier on differentially private training data, and then performs inference on streaming data using its non-differentially private representation. It may then store this streaming data in a differentially private manner in order to guarantee privacy on the stored data. Since the classification system is performing inference on the representation of the data that does not have any random noise added to it, the system can extract more accurate information from the representation and hence achieve better performance. This system design may be used to solve the problem of spam filtering. In spam filtering, the text document is an email and the pre-defined categories are {spam, not-spam}. Details below include the representation used for each email, the randomization mechanisms used to guarantee differential privacy, and then details on an example embodiment of the system of FIG. 2.

With respect to an email representation, given a pre-defined vocabulary $\mathcal{V}$, we may represent each email as one of the below vectors:

(1) Bag of Words: We may count the number of words in each email and represent it as a vector in $\mathbb{N}^{|\mathcal{V}|}$, where each element in the vector is the number of occurrences of a particular word. Then, the total number of words in an email is $$|e| = \sum_{i=1}^{|\mathcal{V}|} |w_i|,$$

where $|w_i|$ is the number of words of type i in the email.

(2) Embedded: Here we may use pre-trained vector representations. First we convert each word in an email to its vector representation. Then we combine each of the word vectors present in the email to create a single vector in any of a variety of ways. In one embodiment, we sum the word vectors, weighted by the number of occurrences of the word. That is, $$e = \sum_{i=1}^{|\mathcal{V}|} c_i w_i.$$

Here $c_i$ is the number of occurrences of the word vector $w_i$ in the email. The embedding dimensionality (dimension of each word vector) used is k (e.g. 300 or some other dimensionality). Therefore, each email is represented as a vector in $\mathbb{R}^k$.

Hence, in both of the above representations, each database is an N×m matrix, where N is the total number of emails in the database and m is either $|\mathcal{V}|$ or k, depending upon the representation chosen.

The DP mechanism 220 of FIG. 2 may be any DP mechanism to guarantee differential privacy. For example, one of two different randomization mechanisms that guarantee differential privacy are a Gaussian Mechanism or a Laplacian Mechanism. In all of the below definitions, we may assume that two databases $X = \{e_1 \ldots, e_i \ldots, e_N\}$ and $X^* = \{e_1 \ldots, e_i^* \ldots, e_N\}$ are neighbors if they differ by only one element $e_i$ and $e_i^*$, such that $e_i$ and $e_i^*$ are neighbors.

Gaussian Mechanism: For any given, $X \in \mathbb{R}^{n \times d}$, the Gaussian Mechanism is a function $\mathcal{M}(X) = X + \Delta$ defined by $\mathcal{M}(\mathcal{X}) = \mathcal{X} + \Delta$, where $\Delta \in \mathbb{R}^{n \times d}$, and $\Delta_{ij} \sim N(\mu, \sigma^2)$, where $\mu, \sigma^2$ are parameters of the Normal Distribution.

Theorem 1: Let $\delta \in (0,1)$ be arbitrary. For $$c^2 > 2 \ln\left(\frac{1.25}{\delta}\right),$$

the Gaussian Mechanism with parameter $$\sigma \geq c \frac{\Delta \mathcal{X}}{\epsilon}$$

is ($\epsilon$, $\delta$)-differentially private where $\Delta X = \|X - X'\|$ for two neighboring databases X and X'.

Laplacian Mechanism: For any given, $X \in \mathbb{R}^{n \times d}$, the Laplacian Mechanism is a function $\mathcal{M}: \mathbb{R}^{n \times d} \to \mathbb{R}^{n \times d}$ defined by $\mathcal{M}(\mathcal{X}) = \mathcal{X} + \Delta$, where $\Delta \in \mathbb{R}^{n \times d}$, and $\Delta_{ij} \sim \text{Lap}(\mu, b)$, where $\mu$, b are parameters of the Laplacian Distribution.

Theorem 2: Let $\epsilon \in (0,1)$ be arbitrary. For $$\mu = 0, b = \frac{\Delta \mathcal{X}}{\epsilon},$$

the Laplacian Mechanism is ($\epsilon, \delta$)-differentially private where $\Delta X = \|X - X'\|_1$ for two neighboring databases X and X'.

The flowchart 200 of FIG. 2 may include a system architecture where, for a given vocabulary $\mathcal{V}$, each email can be represented as a vector in $\mathbb{N}^{|\mathcal{V}|}$ or $\mathbb{R}^k$. Without loss of generality, consider the case where we have N emails and each email is represented as a vector in $\mathbb{R}^k$. Our training database then, is a matrix $X \in \mathbb{R}^{N \times k}$. We first pass the matrix X through a randomization mechanism and then train a machine learning classifier f on this differentially private data, such that f: $\mathbb{R}^k \to \{\text{spam, not-spam}\}$. Since inference may be performed on streaming emails, given an incoming email, we first convert the email into its vector representation $e \in \mathbb{R}^k$ and then pass it to the classifier f, to classify it as spam or not-spam. This allows the classifier f, to make a decision on the pre-noise representation of the email. However, before adding this email to the database X, we pass it through the randomization mechanism. In doing so, we are able to improve the performance of the classifier f during inference, while also preserving $\epsilon$ differential privacy of the database.

Modifications, additions, or omissions may be made to the flowchart 200 without departing from the scope of the present disclosure. In some embodiments, the flowchart 200 may include additional components similar to the components illustrated in FIG. 2 that each may be configured similarly to the components illustrated in FIG. 2.

Figure 3:
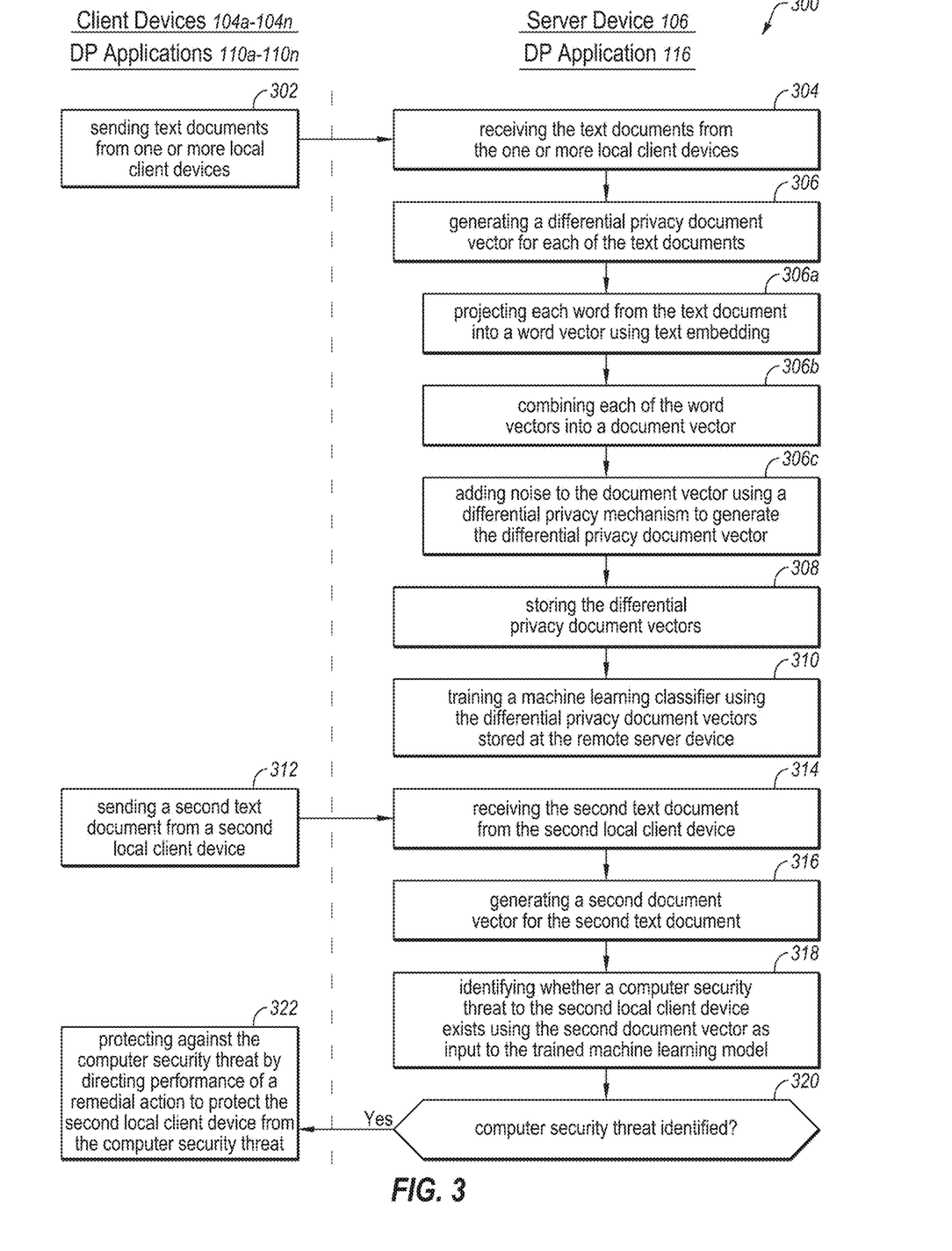
FIG. 3 is a flowchart of an example method for identifying and protecting against a computer security threat while preserving privacy of individual client devices using differential privacy for text documents.

FIG. 3 is a flowchart of an example method 300 for identifying and protecting against a computer security threat while preserving privacy of individual client devices using differential privacy for text documents. The method 300 may be performed, in some embodiments, by one or more applications, devices, or systems, such as by the DP applications 110a-110n and 116 of FIG. 1, or some other application(s), or some combination thereof. In these and other embodiments, the method 300 may be performed by one or more processors based on one or more computer-readable instructions stored on one or more non-transitory computer-readable media. The method 300 will now be described in connection with FIGS. 1, 2, and 3.

The method 300 may include, at action 302, sending and, at action 304, receiving text documents from one or more local client devices. For example, the DP applications 110a-110n may send, at action 302, and the DP application 116 may receive, at action 304, the text documents 112a-112n securely streamed from the client devices 104a-104n.

The method 300 may include, at action 306, generating a differential privacy document vector (also known as a differentially private document vector) for each of the text documents. This may include, at action 306a, projecting each word from the text document into a word vector using text embedding, at action 306b, combining each of the word vectors into a document vector, and at action 306c, adding noise to the document vector using a differential privacy mechanism to generate the differential privacy document vector. In some embodiments, the differential privacy mechanism may not be a local differential privacy mechanism. For example, the DP application 116 may generate, at action 306, a DP document vector for each of the text documents 112a-112n by projecting, at action 306a, each word from the text document into the word vectors 202a-202m using text embedding, combining, at action 306b, each of the word vectors 202a-202m into a document vector 209, and adding at action 306c, noise to the document vector 209 using a differential privacy mechanism to generate the DP document vector 224. Further, since the DP mechanism 220 of flowchart 200 is located remotely at the server device 106 instead of being located locally at the client devices 104a-104n, the DP mechanism 220 is not a "local" differential privacy mechanism, but may instead be considered to be a "remote" differential privacy mechanism with respect to the client devices 104a-104n.

The method 300 may include, at action 308, storing the differential privacy document vectors in a database. In some embodiments, the method 300 may further include sharing, at the remote server device, the differential privacy document vectors stored in the database with other devices without revealing the text documents. For example, the DP application 116 may store, at action 308, the DP document vectors 119 in the DP database 118. Further, the DP application 116 may share the DP document vectors 119 stored in the DP database 118 with other devices (such as with any of the client devices 104a-104n or other network devices) without revealing the actual text documents 112a-112n that were used to generate the DP document vectors 119.

The method 300 may include, at action 310, training a machine learning classifier using the differential privacy document vectors stored in the database. In some embodiments, the training, at action 310, of the machine learning classifier using the differential privacy document vectors stored in the database prevents the text documents from being exposed due to an explorative attack against the machine learning classifier. For example, the DP application 116 may train, at action 310, the machine learning classifier 117 using the DP document vectors 119 stored in the DP database 118.

The method 300 may include, at action 312, sending and, at action 314, receiving a second text document from a second local client device. For example, the DP application 110n may send, at action 312, and the DP application 116 may receive, at action 314, the text document 112n streamed from the client device 104n.

The method 300 may include, at action 316, generating a second document vector for the second text document. For example, the DP application 116 may generate, at action 316, a document vector 209 for the text document 112n.

The method 300 may include, at action 318, identifying whether a computer security threat to the second local client device exists using the second document vector as input to the trained machine learning classifier. If so (Yes at action 320), the method 300 may include, at action 322, protecting against the computer security threat by directing performance of a remedial action to protect the second local client device from the computer security threat. In some embodiments, the performing of the remedial action at the local client device may include one or more of blocking the second local client device from accessing a network, rolling back one or more changes at the second local client device that were made in response to the computer security threat, or temporarily freezing activity at the second local client device, or some combination thereof. For example, the DP application 116 may identify, at action 318, whether a computer security threat to the client device 104n exists using the document vector 209 as input to the trained machine learning classifier 117. If so, the DP application 116 may protect, at action 322, against the computer security threat by directing performance of a remedial action to protect the client device 104n from the computer security threat. In this example, the remedial action may include blocking the client device 104n from accessing the network 102, rolling back one or more changes at the client device 104n that were made in response to the security threat, or temporarily freezing activity at the client device 104n, or some combination thereof. In some embodiments, the remedial action may additionally or alternatively involve an action at a server device, such as blocking an email at an email server device where the email is determined to involve spam and/or spear phishing.

In some embodiments, the second document vector may be used, at action 320, as input to the trained machine learning classifier without storing the second text document to prevent the second text document from being accessed at the remote server device. Further, in some embodiments, using, at action 320, the second document vector, instead of the differential privacy document vector, as input to the trained machine learning classifier increases accuracy of the identifying of the computer security threat. For example, using, at action 320, the document vector 209 as input to the trained machine learning classifier 117, without storing the text document 112n, may prevent the text document 112n from being accessed at the server device 106, for example if a malicious third party were to gain unauthorized access to the server device 106. Further, using, at action 320, the document vector 209, instead of a corresponding DP document vector 224 that is generated from the document vector 209 (which may be generated to be stored with the other DP document vectors 119 to be used in future training of the machine learning classifier 117, for example), as input to the trained machine learning classifier 117 may increase accuracy of the identifying of the computer security threat.

In some embodiments, the method 300 may result in identifying and protecting against a computer security threat while preserving privacy of the individual client devices 104a-104n using differential privacy (and also potentially machine learning) for text documents. Unlike a machine learning classifier that is trained using text documents that were represented using differential privacy mechanisms, the method 300 may use the differential privacy document vectors 119, which were generated using a combination of text embeddings and differential privacy, to train the machine learning classifier 117. This may enable the machine learning classifier 117 to make a more accurate inferred decision, such as a more accurate inferred decision that identifies a security threat to the client device 104n, which may allow for performance of a remedial action to protect the client device 104n from the computer security threat, thus limiting or preventing harm to the client device 104n.

Although the actions of the method 300 are illustrated in FIG. 3 as discrete actions, various actions may be divided into additional actions, combined into fewer actions, reordered, expanded, or eliminated, depending on the desired implementation. For example, in some embodiments, actions 304-306c may be performed without performing other actions of the method 300. Also, in some embodiments, actions 304-310 may be performed without performing other actions of the method 300. Also, the action 318 may be performed to make an inferred decision other than identifying whether a security threat to a client device exists. Further, in some embodiments, any of action 318, action 320, or action 322 may be performed by a network administrator or other entity that is different from the entity or entities performing the other actions of the method 300.

Further, it is understood that the method 300 may improve the functioning of a network device itself, and improve the technical field of differential privacy, such as where differential privacy is employed in identifying and protecting against a computer security threat. For example, the functioning of the client devices 104a-104n and the server device 106 may themselves be improved by the method 300, by identifying and protecting against a security threat while preserving privacy of the individual client devices 104a-104n using differential privacy for text documents. Unlike a machine learning classifier that is trained using text documents that were represented using conventional privacy mechanisms, the method 300 may use the differential privacy document vectors 119, which were generated using a combination of text embeddings and differential privacy, to train the machine learning classifier 117. This may enable the machine learning classifier 117 to make a more accurate inferred decision, such as a more accurate inferred decision that identifies a security threat to the client device 104n, which may allow for performance of a remedial action to protect the client device 104n from the computer security threat, thus limiting or preventing harm to the client device 104n.

FIG. 4 illustrates an example computer system 400 that may be employed in identifying and protecting against a computer security threat while preserving privacy of individual client devices using differential privacy for text documents. In some embodiments, the computer system 400 may be part of any of the systems or devices described in this disclosure. For example, the computer system 400 may be part of any of the client devices 104a-104n, the server device 106, or the malicious network device 108 of FIG. 1.

The computer system 400 may include a processor 402, a memory 404, a file system 406, a communication unit 408, an operating system 410, a user interface 412, and an application 414, which all may be communicatively coupled. In some embodiments, the computer system may be, for example, a desktop computer, a client computer, a server computer, a mobile phone, a laptop computer, a smartphone, a smartwatch, a tablet computer, a portable music player, or any other computer system.

Generally, the processor 402 may include any suitable special-purpose or general-purpose computer, computing entity, or processing device including various computer hardware or software applications and may be configured to execute instructions stored on any applicable computer-readable storage media. For example, the processor 402 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 402 may interpret and/or execute program instructions and/or process data stored in the memory 404 and/or the file system 406. In some embodiments, the processor 402 may fetch program instructions from the file system 406 and load the program instructions into the memory 404. After the program instructions are loaded into the memory 404, the processor 402 may execute the program instructions. In some embodiments, the instructions may include the processor 402 performing one or more actions of the method 300 of FIG. 3.

The memory 404 and the file system 406 may include computer-readable storage media for carrying or having stored thereon computer-executable instructions or data structures. Such computer-readable storage media may be any available non-transitory media that may be accessed by a general-purpose or special-purpose computer, such as the processor 402. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 402 to perform a certain operation or group of operations, such as one or more actions of the method 300 of FIG. 3. These computer-executable instructions may be included, for example, in the operating system 410, in one or more applications, such as in any of the DP applications 110a-110n or 116 or the malicious application 120 of FIG. 1, or in some combination thereof.

The communication unit 408 may include any component, device, system, or combination thereof configured to transmit or receive information over a network, such as the network 102 of FIG. 1. In some embodiments, the communication unit 408 may communicate with other devices at other locations, the same location, or even other components within the same system. For example, the communication unit 408 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, a cellular communication device, etc.), and/or the like. The communication unit 408 may permit data to be exchanged with a network and/or any other devices or systems, such as those described in the present disclosure.

The operating system 410 may be configured to manage hardware and software resources of the computer system 400 and configured to provide common services for the computer system 400.

The user interface 412 may include any device configured to allow a user to interface with the computer system 400. For example, the user interface 412 may include a display, such as an LCD, LED, or other display, that is configured to present video, text, application user interfaces, and other data as directed by the processor 402. The user interface 412 may further include a mouse, a track pad, a keyboard, a touchscreen, volume controls, other buttons, a speaker, a microphone, a camera, any peripheral device, or other input or output device. The user interface 412 may receive input from a user and provide the input to the processor 402. Similarly, the user interface 412 may present output to a user.

The application 414 may be one or more computer-readable instructions stored on one or more non-transitory computer-readable media, such as the memory 404 or the file system 406, that, when executed by the processor 402, is configured to perform one or more actions of the method 300 of FIG. 3. In some embodiments, the application 414 may be part of the operating system 410 or may be part of an application of the computer system 400, or may be some combination thereof. In some embodiments, the application 414 may function as any of the DP applications 110a-110n or 116 or the malicious application 120 of FIG. 1.

Modifications, additions, or omissions may be made to the computer system 400 without departing from the scope of the present disclosure. For example, although each is illustrated as a single component in FIG. 4, any of the components 402-414 of the computer system 400 may include multiple similar components that function collectively and are communicatively coupled. Further, although illustrated as a single computer system, it is understood that the computer system 400 may include multiple physical or virtual computer systems that are networked together, such as in a cloud computing environment, a multitenancy environment, or a virtualization environment.

As indicated above, the embodiments described herein may include the use of a special purpose or general purpose computer (e.g., the processor 402 of FIG. 4) including various computer hardware or software applications, as discussed in greater detail below. Further, as indicated above, embodiments described herein may be implemented using computer-readable media (e.g., the memory 404 or file system 406 of FIG. 4) for carrying or having computer-executable instructions or data structures stored thereon.

In some embodiments, the different components and applications described herein may be implemented as objects or processes that execute on a computer system (e.g., as separate threads). While some of the methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, has been described with reference to specific embodiments. However, the illustrative discussions above are not intended to be exhaustive or to limit the invention as claimed to the precise forms disclosed. Many modifications and variations are possible in view of the above teachings. The embodiments were chosen and described to explain practical applications, to thereby enable others skilled in the art to utilize the invention as claimed and various embodiments with various modifications as may be suited to the particular use contemplated.

The invention claimed is:

1. A computer-implemented method for identifying and protecting against a computer security threat while preserving privacy of individual client devices using differential privacy for text documents, at least a portion of the method being performed by a remote server device comprising one or more processors, the method comprising:
receiving, at the remote server device, text documents from one or more local client devices;
generating, at the remote server device, a differential privacy document vector for each of the text documents, the generating comprising:
projecting, at the remote server device, each word from the text document into a word vector using text embedding by converting each word into one or more numerical terms that in combination are representative of a respective word;
combining, at the remote server device, each of the word vectors into a document vector using a mathematical combination of the one or more numerical terms for each of the word vectors based at least in part on both the one or more numerical terms of the word vectors and a number of occurrences of the respective word; and
adding, at the remote server device, noise to the document vector using a differential privacy mechanism to generate the differential privacy document vector to preserve privacy of the text document by preventing any particular word from being inferred from the differential privacy document vector as being present in the text document;

identifying, at the remote server device, a computer security threat to a first one of the one or more local client devices using the differential privacy document vectors; and in response to identifying the computer security threat, protecting against the computer security threat by directing performance, at the first local client device or the remote server device, of a remedial action to protect the first local client device from the computer security threat.

2. The method of claim 1, wherein the performing, at the one or more local client devices, of the remedial action comprises one or more of blocking the one or more local client devices from accessing a network, rolling back one or more changes at the one or more local client devices that were made in response to the computer security threat, or temporarily freezing activity at the one or more local client devices, or some combination thereof.

3. The method of claim 1, wherein the identifying of the computer security threat to one or more of the local client devices using the differential privacy document vectors comprises:

storing, at the remote server device, the differential privacy document vectors in a database;

training, at the remote server device, a machine learning classifier using the differential privacy document vectors stored in the database; and identifying, at the remote server device, the computer security threat to one or more of the local client devices using the trained machine learning classifier.

4. The method of claim 3, wherein the identifying of the computer security threat to one or more of the local client devices using the trained machine learning classifier comprises:

receiving, at the remote server device, a second text document from a second local client device;

generating, at the remote server device, a second document vector for the second text document; and identifying, at the remote server device, the computer security threat to the second local client device using the second document vector as input to the trained machine learning classifier.

5. The method of claim 3, wherein the training, at the remote server device, of the machine learning classifier using the differential privacy document vectors stored in the database prevents the text documents from being exposed due to an explorative attack against the machine learning classifier.

6. The method of claim 3, further comprising sharing, at the remote server device, the differential privacy document vectors stored in the database with other devices without revealing the text documents.

7. The method of claim 1, wherein the differential privacy mechanism is not a local differential privacy mechanism.

8. One or more non-transitory computer-readable media comprising one or more computer-readable instructions that, when executed by one or more processors of a remote server device, cause the remote server device to perform a method for identifying and protecting against a computer security threat while preserving privacy of individual client devices using differential privacy for text documents, the method comprising:

receiving, at the remote server device, text documents from one or more local client devices;

generating, at the remote server device, a differential privacy document vector for each of the text documents, the generating comprising:

projecting, at the remote server device, each word from the text document into a word vector using text embedding by converting each word into one or more numerical terms that in combination are representative of a respective word;

combining, at the remote server device, each of the word vectors into a document vector using a mathematical combination of the one or more numerical terms for each of the word vectors based at least in part on both the one or more numerical terms of the word vectors and a number of occurrences of the respective word; and adding, at the remote server device, noise by changing at least one numerical value within the document vector using a differential privacy mechanism to generate the differential privacy document vector to preserve privacy of the text document by preventing any particular word from being inferred from the differential privacy document vector as being present in the text document;

identifying, at the remote server device, a computer security threat to a first one of the one or more local client devices using the differential privacy document vectors; and in response to identifying the computer security threat, protecting against the computer security threat by directing performance, at the first local client device or the remote server device, of a remedial action to protect the first local client device from the computer security threat.

9. The one or more non-transitory computer-readable media of claim 8, wherein the performing, at the one or more local client devices, of the remedial action comprises one or more of blocking the one or more local client devices from accessing a network, rolling back one or more changes at the one or more local client devices that were made in response to the computer security threat, or temporarily freezing activity at the one or more local client devices, or some combination thereof.

10. The one or more non-transitory computer-readable media of claim 8, wherein the identifying of the computer security threat to one or more of the local client devices using the differential privacy document vectors comprises:

storing, at the remote server device, the differential privacy document vectors in a database;

training, at the remote server device, a machine learning classifier using the differential privacy document vectors stored in the database; and identifying, at the remote server device, the computer security threat to one or more of the local client devices using the trained machine learning classifier.

11. The one or more non-transitory computer-readable media of claim 10, wherein the identifying of the computer security threat to one or more of the local client devices using the trained machine learning classifier comprises:

receiving, at the remote server device, a second text document from a second local client device;

generating, at the remote server device, a second document vector for the second text document; and identifying, at the remote server device, the computer security threat to the second local client device using the second document vector as input to the trained machine learning classifier.

12. The one or more non-transitory computer-readable media of claim 10, wherein the training, at the remote server device, of the machine learning classifier using the differential privacy document vectors stored in the database prevents the text documents from being exposed due to an explorative attack against the machine learning classifier.

13. The one or more non-transitory computer-readable media of claim 10, further comprising sharing, at the remote server device, the differential privacy document vectors stored in the database with other devices without revealing the text documents.

14. The one or more non-transitory computer-readable media of claim 8, wherein the differential privacy mechanism is not a local differential privacy mechanism.

15. A remote server device comprising:
one or more processors; and
one or more non-transitory computer-readable media comprising one or more computer-readable instructions that, when executed by the one or more processors, cause the remote server device to perform a method for identifying and protecting against a computer security threat while preserving privacy of individual client devices using differential privacy for text documents, the method comprising:
  receiving, at the remote server device, text documents from one or more local client devices;
  generating, at the remote server device, a differential privacy document vector for each of the text documents, the generating comprising:
    projecting, at the remote server device, each word from the text document into a word vector using text embedding by converting each word into one or more numerical terms that in combination are representative of a respective word;
    combining, at the remote server device, each of the word vectors into a document vector using a mathematical combination of the one or more numerical terms for each of the word vectors based at least in part on both the one or more numerical terms of the word vectors and a number of occurrences of the respective word; and
    adding, at the remote server device, noise [by changing at least one numerical value within the document vector using a differential privacy mechanism to generate the differential privacy document vector to preserve privacy of the text document by preventing any particular word from being inferred from the differential privacy document vector as being present in the text document;
  identifying, at the remote server device, a computer security threat to a first one of the one or more local client devices using the differential privacy document vectors; and
  in response to identifying the computer security threat, protecting against the computer security threat by directing performance, at the first local client device or the remote server device, of a remedial action to protect the first local client device from the computer security threat.

16. The remote server device of claim 15, wherein the performing, at the one or more local client devices, of the remedial action comprises one or more of blocking the one or more local client devices from accessing a network, rolling back one or more changes at the one or more local client devices that were made in response to the computer security threat, or temporarily freezing activity at the one or more local client devices, or some combination thereof.

17. The remote server device of claim 15, wherein the identifying of the computer security threat to one or more of the local client devices using the differential privacy document vectors comprises:
  storing, at the remote server device, the differential privacy document vectors in a database;
  training, at the remote server device, a machine learning classifier using the differential privacy document vectors stored in the database; and
  identifying, at the remote server device, the computer security threat to one or more of the local client devices using the trained machine learning classifier.

18. The method of claim 17, wherein the identifying of the computer security threat to one or more of the local client devices using the trained machine learning classifier comprises:
  receiving, at the remote server device, a second text document from a second local client device;
  generating, at the remote server device, a second document vector for the second text document; and
  identifying, at the remote server device, the computer security threat to the second local client device using the second document vector as input to the trained machine learning classifier.

19. The method of claim 17, wherein the training, at the remote server device, of the machine learning classifier using the differential privacy document vectors stored in the database prevents the text documents from being exposed due to an explorative attack against the machine learning classifier.

20. The remote server device of claim 15, wherein the differential privacy mechanism is not a local differential privacy mechanism.

21. The computer-implemented method of claim 1, wherein the receiving the text documents includes receiving streaming data carrying the text documents with a level of privacy guarantee for the text documents, the method further comprising:
  as the streamed data is received and prior to storing the text documents, inferring a classification of the text documents.

* * * * *